United States Patent [19]

Carr et al.

[11] 4,320,694

[45] Mar. 23, 1982

[54] HYDRAULIC MANIFOLD ASSEMBLY

[75] Inventors: Charles W. Carr, East Moline, Ill.; Kevin G. Forster, Terre Haute, Ind.

[73] Assignee: Caterpillar Tractor Co., Peoria, Ill.

[21] Appl. No.: 91,674

[22] Filed: Oct. 4, 1979

[51] Int. Cl.³ .................. F01B 29/00; F16L 39/00
[52] U.S. Cl. ........................... 92/161; 92/146; 285/92; 285/137 R; 285/189
[58] Field of Search ............. 92/161, 146; 285/189, 285/137 R, 92

[56] References Cited

U.S. PATENT DOCUMENTS

| | | | |
|---|---|---|---|
| 165,621 | 7/1875 | Sheridan | 285/137 R |
| 901,837 | 10/1908 | Russell | 92/161 |
| 1,135,720 | 4/1915 | Roach | 285/137 R |
| 2,200,396 | 5/1940 | Martin | 92/161 |
| 2,707,921 | 5/1955 | Jorgensen et al. | 92/161 |
| 4,085,660 | 4/1978 | Yoshinouchi et al. | 92/161 |

Primary Examiner—Paul E. Maslousky
Attorney, Agent, or Firm—Wegner, Stellman, McCord, Wiles & Wood

[57] ABSTRACT

A hydraulic manifold assembly includes a body (20) having an end face (28). Bolts (26) and a flange (22) are employed to mount the body (20) within a sealed chamber (14) in nominally aligned relation with an enlarged opening (30) from the chamber (14). External threads (50) adjacent the end face (28) extend through the opening (30) and a fluid conduit (32) terminates in a port (36) in the end face (28). A nut (52) is sized to cover the opening (30) for any position of nominal alignment of the body (20) to the opening (30) and is disposed on the threads (50) such that a side (64) of the nut covers the opening. A seal (62) is carried by the nut for sealing the interface of the nut (52) and a side (10) of the chamber (14).

4 Claims, 3 Drawing Figures

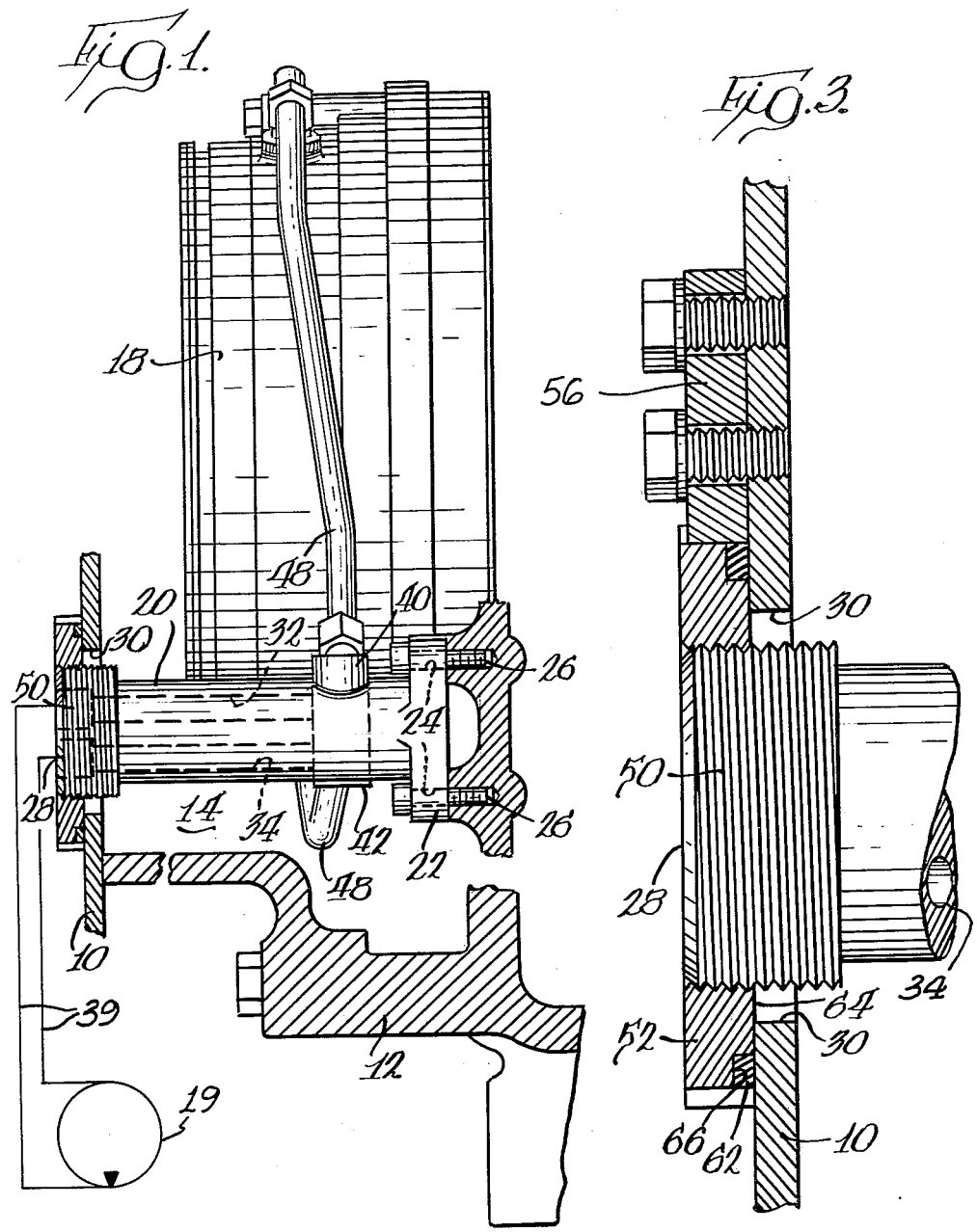

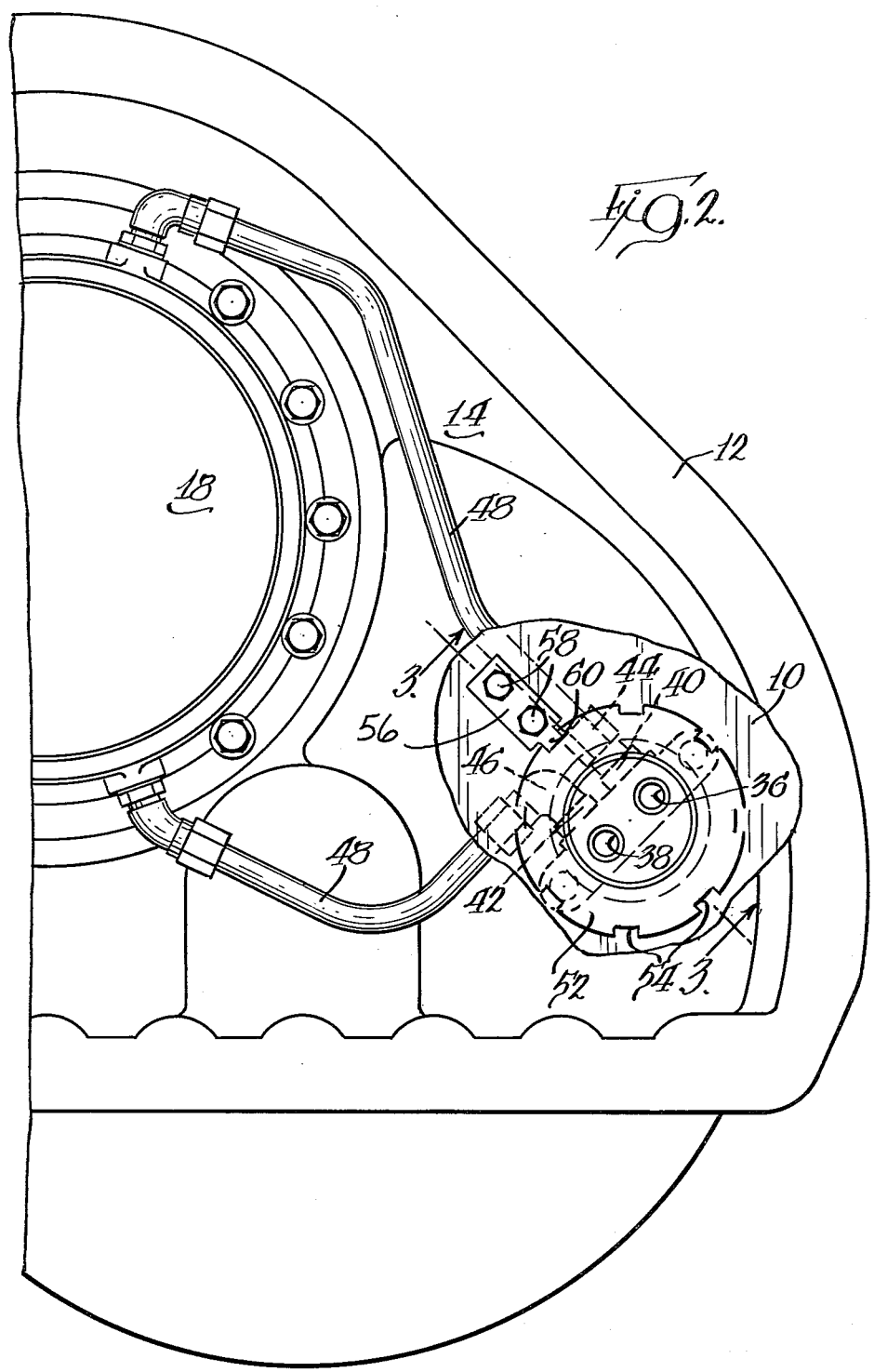

HYDRAULIC MANIFOLD ASSEMBLY

DESCRIPTION

TECHNICAL FIELD

This invention relates to a hydraulic manifold assembly, and more particularly, to such an assembly which is particularly adapted for interconnecting a hydraulic appliance within a substantially sealed chamber and a hydraulic device on the exterior of the chamber.

BACKGROUND ART

In the field of construction or mining vehicles, there frequently is disposed in a chamber, a hydraulic appliance such as a hydraulic motor or pump, a hydraulically operated parking brake, etc. Hydraulic fluid must be conveyed to the hydraulic appliance, often from a hydraulic device exterior of the chamber, by conduits entering the chamber containing the appliance.

Because of the rugged environment in which such vehicles operate, it is mandatory that the chamber be sealed so as to prevent the entry of abrasive foreign material or moisture into the same whereat it could damage mechanical components therein, deleteriously affecting seals and the like. Consequently, the point of entry into the chamber of a hydraulic fluid conduit must be sealed; and this has been accomplished in a number of ways. However, such methods have proved to be quite costly in that relatively expensive components must be employed, or expensive manufacturing procedures followed to maintain the tolerances required to effect a seal while utilizing relatively inexpensive components. The latter has proved to be quite difficult, particularly in the case of vehicles, where the chambers housing the hydraulic appliance may be formed of welded metal and are of large size.

DISCLOSURE OF THE INVENTION

The present invention is directed to overcoming one or more of the problems as set forth above.

The present invention is intended for use in an apparatus including a hydraulic appliance within a substantially sealed chamber to be in fluid communication with a hydraulic device exterior of the chamber. According to the invention there is provided a manifold assembly for extending through an enlarged opening in the sealed chamber while sealing the opening and establishing fluid communication between the appliance and the device. The manifold assembly includes a body having an end face sized to loosely extend through the enlarged opening in the sealed chamber. Means are disposed on the body for securing the body within the sealed chamber in nominally aligned relation with the enlarged opening such that the end face extends therethrough. External threads are located on the body adjacent the end face and are adapted to be located on the exterior of the sealed chamber and extend into the enlarged opening. At least one fluid conduit is located in the body and terminates in a first port in the end face for connection to the hydraulic device. The conduit also terminates in a second port spaced from the first port and adapted to be located within the sealed chamber for connection to the hydraulic appliance. A nut is sized to cover the enlarged opening for any position of nominal alignment of the body to the enlarged opening and is disposed on the external threads such that a side of the nut faces and covers the enlarged opening. A seal is carried by the nut for sealing engagement with the exterior of the chamber about the periphery of the enlarged opening.

As a consequence of this construction, exacting tolerances in forming the body, in securing the body within the chamber, and in aligning the opening with the point of securement need not be followed and yet a reliable seal utilizing components that may inexpensively be fabricated is provided.

DESCRIPTION OF THE DRAWINGS

FIG. 1 is a side elevation of a manifold assembly made according to the invention and shown in its intended environment of use with parts broken away for clarity;

FIG. 2 is a view similar to FIG. 1 but taken at right angles thereto;

FIG. 3 is an enlarged sectional view taken approximately along the line 3—3 in FIG. 2.

BEST MODE FOR CARRYING OUT THE INVENTION

By way of example, a manifold assembly made according to the invention is illustrated in the environment of a frame for a motor vehicle such as that disclosed in United States Defensive Publication T966,007 to Liehr et al published on Jan. 3, 1978, the details and underlying disclosure of which are herein incorporated by reference. As is well known, such a frame includes rearwardly extending rails, forms of plates welded together to form box sections, the interior plate of one of which is shown at 10. A casting 12 forming part of a conventional vehicle final drive housing along with the plate 10 and other components not shown form a chamber 14 which is adapted to be sealed and a hydraulic appliance 18 in the form of a sealed hydraulically disengaged, spring engaged, parking brake 18 of conventional construction is received therein. Actuation of the hydraulic appliance 18 requires the direction of hydraulic fluid thereto from a hydraulic device exterior to the chamber such as a pump 19. Thus, a manifold assembly according to the invention is employed as part of the interconnection between the appliance 18 and the hydraulic device 19.

As seen in FIG. 1, the manifold assembly includes a body 20 which may be of cast construction. One end of the body is provided with a flange 22 having at least two spaced bolt holes 24, extending therethrough for receipt of bolts 26 threaded into a part of the final drive 12 so as to secure the body 20 within the chamber 14. The end of the body 20 opposite the flange 22 is provided with an end face 28 which is sized to loosely pass through an enlarged opening 30 in the inner plate 10. The arrangement is such that the body 20, when secured in place, is nominally aligned with the opening 30 without any need for maintaining exacting tolerances in the location of the bolt holes 24 in the flange 22, or the alignment of the opening 30 with the part of the final drive 12 to which the body 20 is to be secured. By way of example, the opening 30 may be circular and have a diameter of perhaps as much as one half inch more than the diameter of the body 20 at the end face 28. Consequently, a large tolerance of as much as plus or minus one quarter of an inch in the relative positioning of the parts can be allowed and yet achieve the requisite nominal alignment.

The body includes at least one internal conduit 32 although more may be employed if desired. As illustrated in the drawings, a second internal conduit 34 is also employed.

Each of the conduits 32 and 34 terminate in ports 36 and 38, respectively, which are internally threaded for receipt of suitable fittings (not shown) for connection of hydraulic lines 39 to the hydraulic device 19 exterior of the chamber 14. The opposite ends of the conduits 32 and 34 terminate in ports 40 and 42 which in turn are connected to hydraulic piping 48 extending to the appliance 18 and in fluid communication with the inner workings thereof.

The end of the body 20 adjacent the end face 28 is provided with an external threaded surface 50 which is configured to extend through the opening 30 and outwardly of the chamber 14 somewhat. The threaded surface 50 also extends into the opening 30 to some degree as seen in FIGS. 1 and 3. A nut 52 is threaded on to the threaded surface 50 from the exterior of the chamber 14. The nut 52 is sized so as to overlie the opening 30 and cover the same for any position of nominal alignment of the body 20 with the opening 30. That is, the nut 52 closes the opening 30.

As best seen in FIG. 2, the nut 52 is preferably a spanner nut provided with a plurality of notches 54 about its periphery. A locking member 56 may be secured to the plate 10 by bolts 58 and is provided with a nose 60 receivable in any one of the notches 54 so as to lock the spanner nut 52 against rotation once it has been properly installed.

To seal the interface of the nut 52 and the plate 10 about the opening 30 a toroidal seal 62 is carried by the nut 52 on the side 64 thereof facing the plate 10. In a preferred embodiment, the side 64 of the nut 62 is provided with a peripheral groove 66 in which the seal 62 is received. The diameter of the toroidal seal 62 is such that it will always contact the plate 10 about the entire periphery of the seal regardless of the position of nominal alignment of the body 20 with respect to the opening 30. Thus, if the opening 30 has a diameter one half inch greater than the diameter of the threaded portion 50 of the body 20, the groove 66 and the seal 62 will have a diameter at least about one inch greater than the diameter of the threaded portion 50.

INDUSTRIAL APPLICABILITY

A manifold assembly made according to the invention is particularly suited for use in establishing fluid communication between hydraulic elements, one of which is enclosed within a seal chamber and the other is exterior thereof where the chamber is formed of plates welded together or otherwise fabricated by techniques wherein exacting tolerances are difficult and/or expensive to maintain. Thus, relatively loose tolerances may be employed in positioning the opening 30 in the plate 10 with respect to the part of the final drive 12 receiving the bolts 26 and in forming the bolt holes 24 in the flange 22.

With just minimal concern for tolerances, the body 20 will be immediately aligned with the opening 30 and the opening 30 closed and sealed by a relatively inexpensive nut 52 and seal 62.

We claim:

1. In an apparatus including a hydraulic appliance (18) within a substantially sealed chamber (14) to be in fluid communication with a hydraulic device 19 exterior of the chamber, a manifold assembly for extending through an enlarged opening (30) in the sealed chamber while sealing the opening and establishing fluid communication between said appliance and said device the improvement comprising: a body (20) having an end face (28) sized to loosely extend through the enlarged opening in the sealed chamber, means (22,24) on the body for securing the body within the sealed chamber in nominally aligned relation with the enlarged opening such that the end face extends therethrough, external threads (50) on the body adjacent said end face extending through the enlarged opening to the exterior of the sealed chamber, at least one fluid conduit (32,34) in the body terminating in a first port (36,38) in said end face for connection to the hydraulic device and second port (40,42) spaced therefrom and adapted to be located within the sealed chamber for connection to the hydraulic appliance, a nut (52) sized to cover the enlarged opening for any position of nominal alignment of the body to the enlarged opening disposed on said external threads such that a side (64) of the nut faces and is adapted to cover the enlarged opening and a seal (62) carried by said side of said nut for sealing engagement with the exterior of the chamber about the periphery of the enlarged opening.

2. The manifold assembly of claim 1 wherein said nut (52) is a spanner nut having a series of spaced notches (54) in its periphery, a locking (56) member having a nose (60) disposable in one of said notches, and means (58) for securing said locking member to the exterior of the chamber.

3. The manifold assembly of claim 1 or 2 wherein in said side (64) of said nut is provided with a peripheral groove (66) and said seal (62) is disposed in said groove.

4. The manifold assembly of claim 1 wherein said securing means include a flange (22) on said body remote from said end face, and at least two bolt holes (24) in said flange.

* * * * *